July 28, 1953
M. PICKERT
2,647,021
ELECTRIC CONTROL FOR INDEPENDENT RELEASE
PORTIONS OF AIR BRAKE CONTROL VALVES
Filed Jan. 11, 1951
3 Sheets-Sheet 3
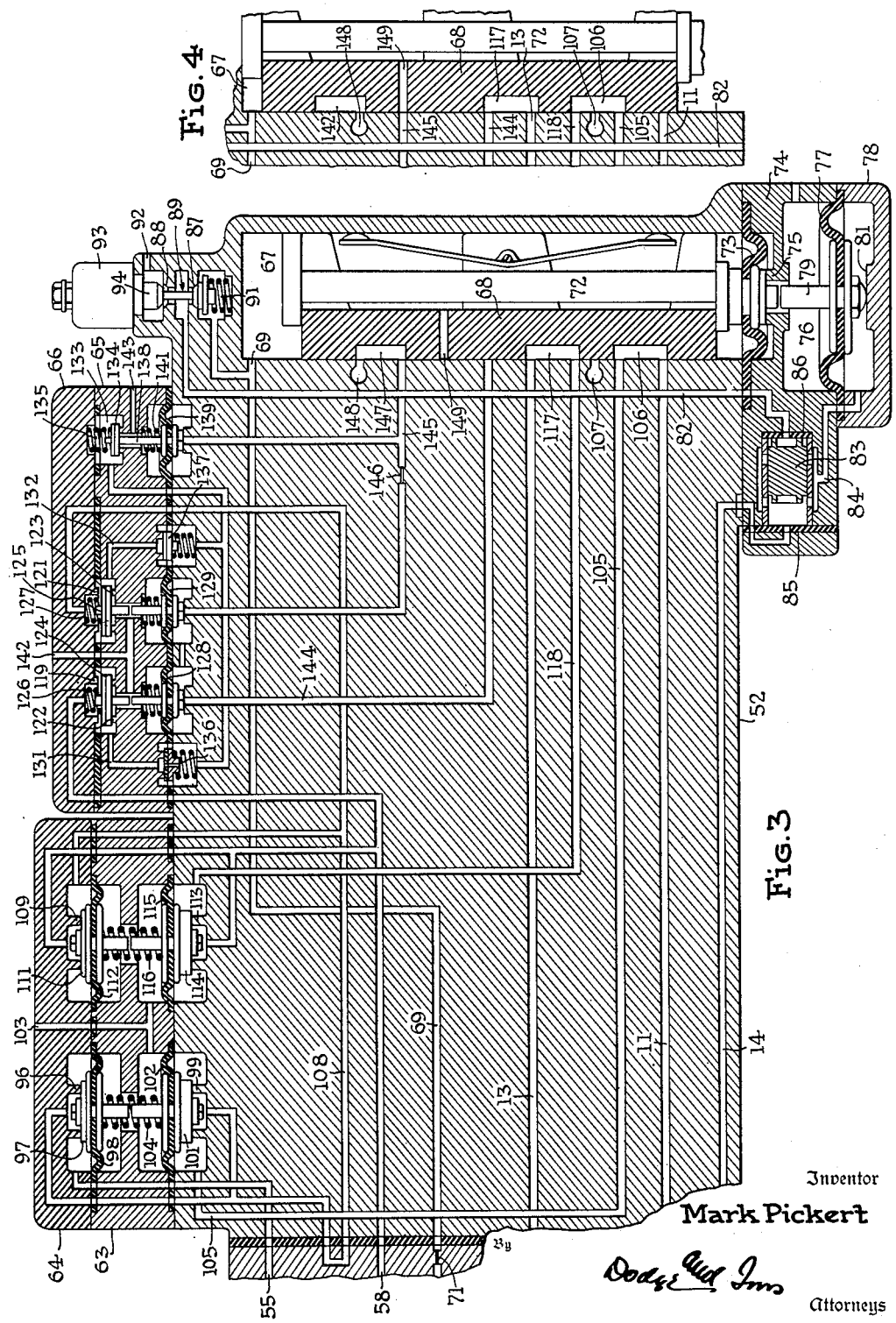
Inventor
Mark Pickert
Dodge and Sons
Attorneys Patented July 28, 1953

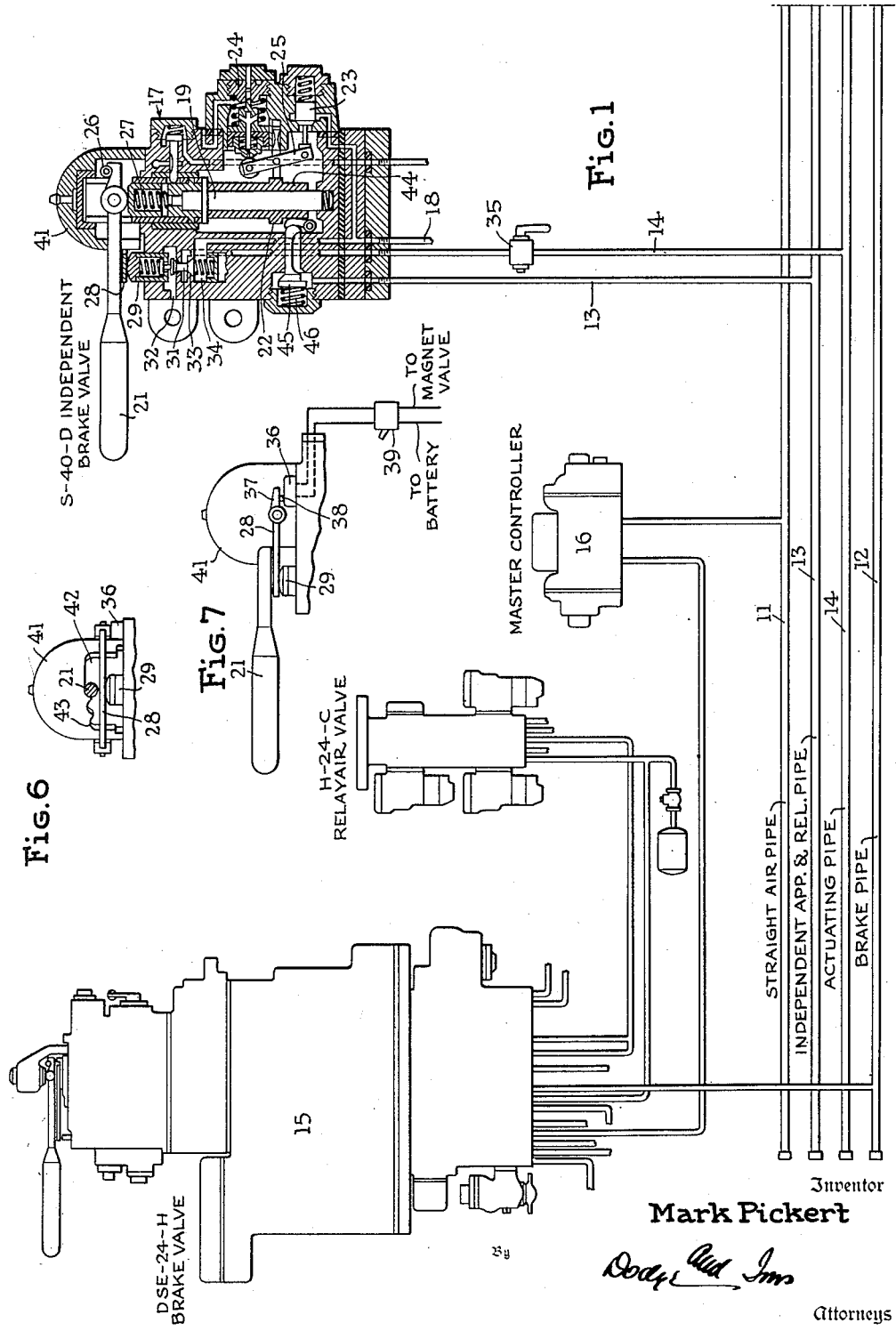

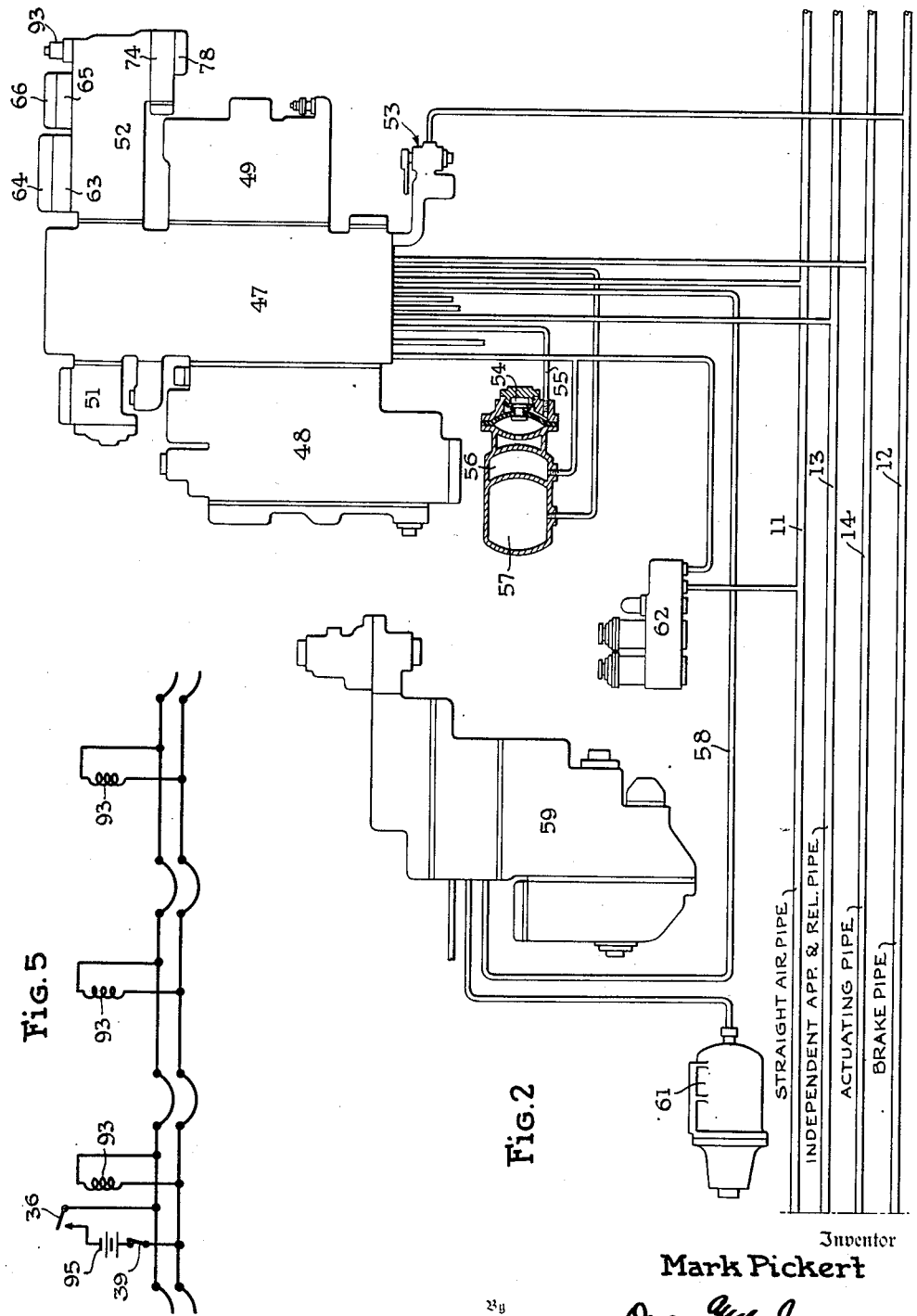

2,647,021

UNITED STATES PATENT OFFICE 2,647,021

ELECTRIC CONTROL FOR INDEPENDENT RELEASE PORTIONS OF AIR BRAKE CONTROL VALVES

Mark Pickert, Watertown, N. Y., assignor to The New York Air Brake Company, a corporation of New Jersey Application January 11, 1951, Serial No. 205,477

4 Claims. (Cl. 303—26)

This invention relates to air brakes and provides an improved independent application-and-release portion for use with control valves such as the well-known D–24 control valve.

In my copending application Serial No. 135,936 filed December 30, 1949, which became Patent No. 2,645,530, July 14, 1953, there is described an arrangement applied to the control valves of the locomotive units and used for accelerating independent releases of the brakes on such units. In the device of the earlier application an electric accelerating valve is superposed on pneumatic means which normally pilot the operation of the release slide valve.

According to the present invention the system may be set manually for either of two conditions in one of which the release slide valve is subjected to pneumatic control, exercised through the actuating pipe. In the second setting the actuating pipe is interrupted, and the release slide valve is piloted exclusively by an electrically actuated admission and exhaust valve which determines the pressure in the actuating motor of the release slide valve.

The new scheme gives faster electric independent releases and better control of graduated electrical independent releases made by manipulation of the independent brake valve. The fact that purely pneumatic control is not continuously effective as a stand-by as it is in the device of the earlier invention is not a serious defect because the only function involved is release and release limited to the locomotive brakes.

A brief description of systems using control valves will make it possible to simplify the detailed description of the invention since the more important novel features are in the release portion.

Fundamental elements of any such air brake system are a normally charged automatic brake pipe and a normally vented straight-air pipe each of which extends the entire length of the locomotive and train, a source of compressed air on the locomotive, an engineer's brake valve on the locomotive supplied by said source and capable of being set selectively to control the brake pipe on the automatic principle or control the straight-air pipe on the straight-air principle, and a plurality of control valves, one on each vehicle (including one on each locomotive unit), said valves being connected with both said pipes to be controlled selectively by pressure variations in each. A relay valve on each vehicle directly controls the admission and exhaust of air to and from the brake cylinders on each vehicle.

In automatic applications the control valve establishes pressures in a related displacement volume reservoir and this pressure controls the relay. In straight-air applications pressures developed in the straight-air pipe directly control the same relay. The system commonly includes an electro-pneumatic master controller which accelerates pressure changes throughout the length of the straight-air pipe.

In a simple system, as above outlined, the brakes can be controlled on the automatic basis (and are so controlled in case of need) but straight-air operation is used under normal conditions, the automatic system then standing by as a safety feature, available at any time, and effective to produce an automatic emergency application in case the train breaks in two.

In such a system the brakes on all vehicles would apply and release together. While this is desirable under certain conditions, it is also desirable to be able to apply locomotive brakes alone, or apply the train brakes alone or having applied locomotive and train brakes together (on either straight-air or automatic basis) to release the locomotive brakes while the train brakes remain applied. Independent control of locomotive brakes is effected by a so-called independent brake valve on the locomotive and the independent application and release valve portions, one of which is associated with the control valve of each of the locomotive units.

Such arrangements are in commercial use, and the present invention is directed primarily to improvements in the independent application-and-release valve portions.

The independent brake valve, as commercially constructed can be used. This is a self-lapping valve fed from the main reservoir and controlling pressure in what the art calls the "independent application-and-release pipe." As a practical matter this is a second straight-air pipe connected only to the application and release portions of the control valves on the various locomotive units.

The commercial independent brake valve (known as the S–40–D) has a vertical stem which is turned about its axis to establish and maintain any desired pressure in the independent application and release pipe. It is operated by a handle which swings in a horizontal plane to operate the self-lapping valve. This handle is hinged on a horizontal axis and may be swung downward from any of its horizontal positions to actuate, through an arcuate bail, another valve device which when actuated by depression of the handle charges a normally vented pipe (called the actuating pipe), leading to the motor piston of the independnet application-and-release portion.

When the handle is up, in its normal plane, the motor is inert and the release slide valve which it actuates moves to a normal or "running" position. When the handle is down, the motor is rendered active and moves the release slide valve to its releasing position.

The S–40–D independent brake valve has a special position in which the handle is latched down so that supply of air to and exhaust of air from the application-and-release pipe are both inhibited. This detail is useful in connection with certain aspects of the invention.

The mechanism so far described is known in the art. It is convenient to combine the two handle functions in a single valve mechanism and to provide the latch-down feature as is done in the S–40–D independent brake valve. However, the invention could be otherwise embodied.

The general operative characteristics of a system including the present invention are as follows:

The independent brake valve is normally maintained in release position with the handle up.

If, under these conditions, the engineer's brake valve is manipulated to apply the brakes, either on the automatic principle or on the straight-air principle, all brakes on the train including the locomotive brakes will apply. With the brakes so applied, depression of the independent brake valve handle without moving it from its release position will cause a release of the locomotive brakes while the train brakes remain applied. This is so whether the independent release mechanism is set to operate on the strictly pneumatic basis or on the electrical basis. The electrical basis gives a more rapid release but the ultimate effect is the same.

The characteristics are different, however, in the case of a partial release of the locomotive brakes.

If the release mechanism is set to operate on the purely pneumatic basis (automatic or straight-air), or with electric control in effect following a straight-air application, the independent brake valve handle is first moved to an appropriate partial application position and is then depressed whereupon the locomotive brakes will release for a definite time interval and then lap. Independent release of the locomotive brakes may thereafter be completed by swinging the independent brake valve handle to release position while maintaining it depressed. The partial release above described, though it results from a special manipulation of a standard independent brake valve, is the effect of a novel organization of the independent application and release portion hereinafter described. It depends on pressure relationships between the actuating pipe and the independent application-and-release pipe. These relationships can be established by a wide variety of valve mechanisms beside the S–40–D valve.

If the independent mechanism is set to operate on the electrical basis, the locomotive brakes can be graduated off, following an automatic application, by depressing the brake valve handle for short periods of time. If a complete release is desired, all that is necessary is to hold the independent brake valve handle down until the locomotive brakes have completely released. Under electrical manipulation the release function is reduced by depressing the handle while in release position.

If the handle of the independent brake valve is held depressed in release position, while the engineer's brake valve is manipulated to produce an application, only the train brakes will apply. The same is true if the latched-down position of the S–40–D independent brake valve is in use during making of the application.

Without changing the pneumatic functions which occur when the device is set for purely pneumatic release control, the invention affords a very rapid independent release of the locomotive units and assures practically perfect synchronization of the releasing action on locomotives of the multiple unit type.

It may be remarked at this point that the arrangement is such that when the independent brake valve handle is carried in its latched down position, an automatic application (but not a straight-air application) will be effective on the locomotive units as well as on the train. This assumes, of course, that the latched down position inhibits venting of the application-and-release pipe and this is the fact when the S–40–D independent brake valve is used.

A preferred embodiment of the invention will now be described by reference to the accompanying drawings in which:

Fig. 1 is a simplified diagram partly in elevation and partly in section of the engineer's brake valve, the independent brake valve and such connections as are related to the invention.

Fig. 2 is a similar diagram of the control valve, the related relay and such connections as are significant in connection with the invention.

NOTE.—Figs. 1 and 2, when assembled end to end, from left to right, produce a simplified diagram of the brake system for the leading locomotive unit. Each succeeding locomotive unit carries at least the equipment diagrammed in Fig. 2, but it is not deemed necessary merely to duplicate Fig. 2 to illustrate the brake components for the second, third or fourth units.

Fig. 3 is a section through the independent application-and-release portion, used as a part of the control valve for each locomotive unit. The view is diagrammatic to the extent that all ports are drawn as if they lay in the plane of section. The pilot slide valve is shown in running (normal) position.

Fig. 4 is a fragmentary view similar to a portion of Fig. 3 but showing the pilot slide valve in releasing position.

Fig. 5 is a diagram of the electric control circuit.

Fig. 6 is a fragmentary view showing how the handle of the independent brake valve is latched down.

Fig. 7 is a fragmentary view showing the switch associated with the independent brake valve and used in the circuit of Fig. 5 to cause the simultaneous operation of all the pilot valves in the independent release portions on a multiple unit locomotive.

Refer first to Figs. 1 and 2. The pipes which extend from end to end of the train are the straight-air pipe 11 and the automatic brake pipe 12. The pipes which extend from end to end of the locomotive (which commonly would comprise more than one unit and often three or more) are the independent application-and-release pipe 13 and the actuating pipe 14.

The engineer's brake valve is shown at 15 as of the DSE 24 H type but other usable convertible automatic-straight-air types are available. It is supplied with air by main reservoir connections not specifically identified and is connected directly with the brake pipe 12. It is connected with the straight-air pipe 11 through the master controller 16.

The independent brake valve 17 is supplied with air through connection 18 and is shown as of the S–40–D type. This is a standard self-lapping valve; and requires only general description. The vertical spindle 19 may be turned by a handle 21 and carries a cam 22 which operates the inlet valve assembly 23 and the exhaust valve assembly 24 through a "walking beam" 25. The valve is shown in release position in which it vents pipe 13. As handle 21 is swung to the right the valve establishes and maintains in pipe 13 an increasing pressure, there being a different maintained pressure for each position of the valve.

The handle 21 may be depressed, pivoting about an axis 26 against the upward thrust of spring plunger 27. When depressed it forces an arcuate bail 28 down against the resistance of spring plunger 29 and shifts the spool valve 31 from the exhaust position shown in Fig. 1 to a supply position in which exhaust port 32 is closed and inlet port 33 is open and it delivers air under pressure from supply passage 34 to the actuating pipe 14 through the branch connection in which a stop valve 35 is interposed. This valve is closed when electric control of independent release is desired, and open when pneumatic control is desired.

A small switch 36 (not a part of the standard S–40–D valve) is mounted as shown in Fig. 7, so that when handle 21 is up, a trigger 37 on bail 28 engages the actuating plunger 38 of the switch and holds the switch open, the switch being biased to close.

The circuit through switch 36 is controlled by a manual switch 39 (shown in Fig. 7). Closure of valve 35 disconnects actuating pipe 14 from the independent brake valve and opening of switch 39 interrupts the circuit controlled by switch 36, which, as will be made clear, is the circuit controlling independent release.

When independent releases are to be controlled pneumatically, valve 35 is open and switch 39 is open, i. e. is set to interrupt the independent release circuit normally controlled by switch 36. When independent releases are to be electrically controlled (and this is the usual condition) valve 35 and switch 39 are each closed. Obviously, they can be arranged to be actuated in unison by a single manual actuator, but it is deemed unnecessary to illustrate this conventional expedient.

It is desirable to provide means for latching handle 21 down, so that locomotive brakes will remain released even when train brakes are applied. For this purpose a guard 41 (see Fig. 6) is mounted on the body of valve 17 and has an open portion 42 which permits the horizontal swinging motion of handle 21 between release and full application positions. It has also a latch-down notch 43 which can be reached only by depressing handle 21 and swinging it to the left beyond release position to latch-down position. In this position the actuating pipe 14 is charged but the independent application-and-release pipe 13 is not vented at the independent brake valve (as it is in release position). In this one latch-down position a second cam 44 on stem 19 permits valve 45 to close under the urge of spring 46, isolating pipe 13 from valve 17, and establishing the condition above-stated.

The D–24 control valve here chosen for illustration comprises a pipe bracket 47 to which all pipe connections are made, a service portion 48, an emergency portion 49, a controlled emergency portion 51 and an independent application-and-release portion 52 which last embodies the principal novel features of the present invention.

The brake pipe 12 is connected with the control valve through a cut-out cock and dust collector generally indicated at 53. The brake pipe is normally charged. Reductions of brake pipe pressure at service rates cause service portion 48 to operate and reductions at emergency rates cause both portions 48 and 49 to operate. In respective cases, the displacement reservoir 54 is charged through connection 55 from the auxiliary reservoir 56 or from both the auxiliary reservoir 56 and emergency reservoir 57, depending on whether the application is of the service or emergency type. The resulting pressure is communicated through pipe 58 to relay 59 and operates the relay 59 to establish a related pressure in the brake cylinder typified by the cylinder 61.

The normally vented straight-air pipe 11 is connected through the control valve with the control connection 58 of relay 59. Pressure developed in the straight-air pipe operates relay 59 to develop a related pressure in the brake cylinder 61.

The magnet valve unit 62 has the usual electrical connections (not diagrammed) with the master controller 16 so that in straight-air operation, straight-air pipe pressures vary uniformly throughout the length of the train.

The system so far described conforms to commercial practice (except for parts 35, 36, 37, 38, 39) and is described in detail in Instruction Pamphlet No. 59 published May, 1948 by The New York Air Brake Company and entitled "No. 24–RL Brake Equipment." A copy is on file in Division 47 of the U. S. Patent Office.

The independent application-and-release portion 52 will now be described in detail by reference to Figs. 3 and 4. Certain passages in these figures are in free communication with pipes 11, 13, 14, 55, and 58, and to facilitate description these passages, being mere extensions of said pipes, are identified by the same reference numerals.

The body of the independent application-and-release portion is indicated in Figs. 2 and 3 at 52. This is bolted to the pipe bracket 47 and contains passages which register with corresponding passages in the pipe bracket. Mounted on the body 52 is the housing 63 of four diaphragm-actuated valves which perform what might be described as switching functions. The top of the housing 63 is closed by a chambered cap 64. A second housing 65, also bolted to the body 52, contains certain diaphragm-operated valves and check valves hereinafter described. The recessed cap 66 overlies the housing 65 and closes chambers in the upper portion thereof. Gaskets are used to seal joints as is clearly indicated in the drawing but, since the gaskets are conventional, it is deemed unnecessary to apply reference numerals to them.

At the right-hand end of the body 52 there is a slide valve chamber 67 in which there works the pilot slide-valve 68. The chamber 67 is supplied with air at main reservoir pressure by a passage 69 in which is interposed a restriction 71, designed to limit the rate at which main reservoir air is supplied.

The slide-valve 68 is confined between lugs on a stem 72. The lower end of the stem 72 is sealed to the center of a slack diaphragm 73 whose margin is clamped between the body 52 and the housing 74. Thus, main reservoir pressure in the chamber 67 acts downward against the flexible diaphragm 73 and biases the valve toward running position, shown in Fig. 3. Running position is defined by collision of a collar on the stem 72 with the annular flange 75 within chamber 76, as shown in Fig. 3.

A second and larger slack diaphragm 77 closes the lower face of the chamber 76 and is sealed to housing 74 at its periphery by a chambered cap 78. A stem 79 is clamped to the center of the slack diaphragm 77 and is in position to engage the lower end of the stem 72 and force it upward until it is arrested by collision with the end of chamber 67. At this point the valve 68 is in releasing position (see Fig. 4). Downward motion of stem 79 is limited by collision with a boss 81 formed within the cap 78. The chamber 76 between diaphragms 73 and 77 is vented to atmosphere, as indicated in the drawing.

The chamber below the diaphragm 77 is the working space of a single-acting motor which when placed under pressure moves the valve 68 to independent releasing position, shown in Fig. 4 and which when vented allows the valve 68 to be moved to the running position shown in Fig. 3. Pneumatic control of diaphragm 77 is exercised by pressures developed in actuating pipe 14. Electric control is exercised by developing pressure in or venting a port 82. Since these controls are to be exercised selectively, a double-seated check valve 83 is used to connect the chamber below diaphragm 77 with actuating pipe 14 upon the development of pressure in that pipe and to connect it with passage 82 when pressures are developed in that passage.

The connections established by the valve 83 are such that each excludes the other. To bring about this result a passage 84 leads to the side connection of the double-seated check valve body. The actuating pipe 14 is connected through one seat 85 of the double-seated check valve and the passage 82 is connected through the other seat 86 of this same valve.

The function of the valve 83, therefore, is to connect the space below diaphragm 77 with whichever of the passages 14 or 82 is under pressure and disconnect it from the other. The valve 83 automatically makes this connection and the disconnections which it simultaneously makes are equally important because they inhibit the loss of actuating pressure through that control mechanism which at the time is inactive.

Pressure in the passage 82 is controlled by a double-beat inlet and exhaust valve mechanism whose inlet seat is shown at 87 and whose exhaust seat is shown at 88. The combined inlet and exhaust valve unit is generally indicated by the numeral 89 and is biased by a spring 91 in a direction to close the inlet and open the exhaust.

Pressure fluid is supplied by a branch of main reservoir passage 69 to the space below the supply seat 87. The space above the exhaust seat 88 is vented to atmosphere at 92. The passage 82 communicates with a space between the two valve seats. The valve unit may be moved to admission position by energizing a winding 93. When energized the effect is to depress an armature 94 connected to the valve unit 89.

As diagrammed in Fig. 5 the normally open switch 36 (see Fig. 7) controls a circuit which includes the current source 95 and all the windings 93 on the various locomotive units, said windings being connected in parallel with each other. This control is effected only when the switch 39 is in its normal closed position and at that time the valve 35 is closed to disconnect the actuating pipe from the independent brake valve.

It follows that the independent brake valve will actuate all the release portions on all the units of the locomotive simultaneously when the electric circuit is operative. Where the slower response of pneumatic control is acceptable the switch 39 is opened to render the switch 36 inactive and the valve 35 is opened to afford communication from the independent brake valve to the actuating pipe.

The two dual valve mechanisms in the housing 63 and cap 64 replace two double-seated check valves heretofore used, and perform similar functions. These are, under normal running conditions, to establish selective connections to the control connection 58 of the relay, from the displacement volume reservoir connection 55 or the straight-air pipe 11 or the independent application-and-release pipe 13, according to which of the three is under pressure. Only one of them is under pressure at any one time. The dual valves afford the same paths for release backflows, and close selectively to preclude escape of air through such passages as are vented.

The left-hand dual valve unit comprises an upper valve seat 96, an upper valve 97 and a diaphragm 98, a lower valve seat 99, a lower valve 101 and a lower diaphragm 102. The seats 96 and 99 are presented toward each other so that the valve 97 closes upward and the valve 101 closes downward. The centers of the diaphragms are sealed to respective valves and the margins of the diaphragms are sealed to the housing 63. As indicated, the space between the diaphragms is vented to atmosphere via passage 103. The stems of the valves are nearly in contact so when either is open it holds the other closed. A light spring 104 encircles the stems of the two valves. It does not load them when both are closed, but is then effective to retain both valves substantially in contact with their respective seats.

The passage 55 which is in communication with the displacement volume reservoir 54 leads to the chamber above the upper diaphragm 98 and a passage 105 which, under normal conditions is in communication with the straight-air passage 11, leads to the space below the lower diaphragm 102. Thus, if either of the passages 55 or 105 is under pressure, the corresponding valve 97 or 101 will be unseated, and the other seated.

It may be remarked at this point that the passages 11 and 105 terminate in the seat of valve 68 and are connected by a cavity 106 when the slide-valve 68 is in its running position (Fig. 3). When the valve is in its upper releasing position (Fig. 4), the port 11 is blanked at the seat, and port 105 is vented through cavity 106 and exhaust port 107.

A branched passage 108 leads from the spaces within respective valve seats 96 and 99, so that if either valve 97 or 101 is unseated, a connection is established to the passage 108.

The right-hand diaphragm valve unit in housing 63 is structurally identical with that already described. The upper seat is indicated at 109, the upper valve at 111, and the upper diaphragm at 112. The lower valve seat appears at 113, the lower valve at 114, and the lower diaphragm at 115. The space between the two diaphragms is vented by passage 103 and the two valves are urged substantially into contact with their seats by the light coil compression-spring 116.

A branch of the passage 108 above mentioned leads to the space above the diaphragm 112. The independent application-and-release pipe 13 (Figs. 1 and 2) is in communication with the independent application-and-release passage also numbered 13 which terminates in the seat of the slide-valve 68. When the valve is in its lower (running) position, this is connected by a cavity 117 in the slide-valve with an extension passage 118 which leads from the seat of the slide-valve to the space below the diaphragm 115. Passage 105 as well as passage 118 is connected by cavity 106 with exhaust port 107 when the pilot valve 68 is in exhaust position, Fig. 4.

Branches of the passage 58 lead from the spaces within respective valve seats 109 and 113, so that valves 111 and 114 control connection to the relay valve 59.

The control connection 58 to the relay 59 and the connection 108 which communicates selectively with the displacement volume reservoir 54 and the straight-air pipe 11 are each directly vented as a part of the independent releasing operation. For this purpose extensions of passages 58 and 108 lead respectively to upper valve seats 119 and 121 on the cap 66. Opposed to these seats are respective (lower) exhaust seats 122 and 123 toward which, respectively, double-beat valves 124 and 125 are biased by coil compression springs 126 and 127.

Each of the above valves 124 and 125 may be forced to close against its upper seat (119 or 121) by stems attached to motor diaphragms 128 or 129. The spaces between the above named pairs of valve seats are connected by passages 131 and 132 with the space 133 above main exhaust valve 134 which is biased to close by spring 135. Check valves 136 and 137 are interposed in passages 131 and 132 respectively to inhibit crossflow. Both open in the direction of exhaust flow, both are lightly spring-urged in a closing direction and check valve 136 has a small by-pass port leading through it.

A stem 138 attached to motor diaphragm 139 is arranged to unseat valve 134 against the resistance of springs 135 and 141 and the pneumatic pressure which seats the valve. The spaces above all three diaphragms 128, 129 and 139 are vented to atmosphere, the first two through passage 142 and the third through exhaust passage 143.

The spaces below diaphragms 128 and 129 are in free communication with each other. A passage 144 leads from this common space to the seat of pilot slide-valve 68 at such a point that the valve blanks the passage in running position (Fig. 3), whereas in release position (Fig. 4) cavity 117 connects it with the independent application-and-release passage 13.

A passage 145 leads from the seat of valve 68 to the space below motor diaphragm 139 and through a choke 146 to the connected spaces below diaphragms 128 and 129. In running position (Fig. 3) a cavity 147 connects passage 145 to exhaust port 148. In releasing position (Fig. 4) passage 145 is put under main reservoir pressure by the registration with it of port 149 which extends through valve 68. In releasing position of the pilot valve 68, cavity 106 connects passages 105 and 118 with exhaust port 107.

*Operation*

An automatic application produced by manipulation of the engineer's brake valve 15 will develop pressure in the connection 55. A straight-air application produced the same way would cause the development of pressure in the passage 11 and consequently also in the passage 105. Depending on which type of application is made, the valve 97 or the valve 101 will open. From there on the flow is by the passage 108 to the space above diaphragm 112.

This opens the valve 111 and flow continues via passage 58 to the relay 59. There is also flow from passages 58 and 108 past the open valves 124 and 125 and respective check valves 136 and 137 to the chamber 133 above the closed local release valve 134.

If the resulting application is released at the engineer's brake valve, the exhaust flows would follow the courses already outlined.

Now suppose that with an automatic brake application in effect with the valve 35 and switch 39 each closed, it is desired to release the locomotive brakes alone. The independent brake valve handle 21 is depressed to close switch 36 and energize the circuit through magnet 93, moving plunger 94 down to close exhaust valve 88 and open valve 87. Air at main reservoir pressure flows from the slide valve chamber of the pilot valve through passage 69, past open valve 87 to passage 82. Since the cock 35 in the cab is closed at this time, no actuating pipe pressure exists in passage 14, hence double throw check valve 83 is moved to the left against seat 85 and main reservoir air may then enter the chamber beneath diaphragm 77 moving it and slide valve 68 upward. In this position of slide valve 68 the through port 149 registers with passage 145 to admit air at main reservoir pressure to the chamber below diaphragm 139 to open valve 134. This permits flow of air from the displacement reservoir thru pipe and passage 55, past valve 97 to passage 108, past valve 125 to passage 132, past check valve 137, past open exhaust valve 134 and out to atmosphere through exhaust passage 143. Air may also flow from the relay valve 59 through pipe and passage 58 past valve 124 through passage 131, opening check valve 136 to flow past open valve 134 and through passage 143 to exhaust. Thus, if the independent brake valve handle is retained in the depressed position the locomotive brakes will be completely released.

If it is desired to graduate the locomotive brakes off in steps, following an automatic brake application, the handle 21 is returned to its upper or normal position after being depressed for only a brief interval. When the handle 21 is depressed, release of the locomotive brakes will be initiated as described above but when the handle is returned to its upper position the switch 36 is opened, de-energizing magnet 93 to close valve 87 and open valve 88 to vent air from beneath diaphragm 77 causing the slide valve to be returned to its lower position, as shown in Fig. 3. That, in turn, vents passage 145 and the chamber below diaphragm 139 through slide valve port 147 to exhaust port 148, permitting valve 134 to close, terminating exhaust of control pipe air from relay valve 59, thereby retaining a part of the brake application. The number of graduations obtained in the release of the locomotive brakes with this equipment, by the manipulation just described, will vary inversely with the length of time the independent brake valve handle is held depressed during each repeated releasing cycle.

In order to release completely the locomotive brakes, with a straight air brake application in effect, it is necessary only to depress the independent brake valve handle 21 to close switch 36. The independent application and release valve portion (Fig. 3) then performs the same brake-releasing functions as described above under release of an automatic brake application.

To obtain a graduated release of a straight air brake application the handle 21 is first moved to a partial application position in order to initiate pressure development in the independent application and release pipe and passages 13 on all units of the locomotive. The handle 21 is at once depressed to energize magnet 93 and cause slide valve 68 to move to its upper position in which valve 134 is moved up to its venting position to initiate the release of the brakes, as before described. However, in the upper position of valve 68 port 117 connects passage 13 with passage 144 to admit air to the chambers beneath diaphragms 128 and 129. Simultaneously air from passage 145 flows through the restricted port 146 to augment the pressure development in these same chambers. As soon as sufficient pressure has developed to lift the diaphragms the valves 124 and 125 will be moved thereby to their upper positions to arrest the flow of air from the relay valve and thus terminate the initial brake release. In moving to its upper position the slide valve 68 also blanks off straight air pipe and passage 11 from registry with port 106 which now connects passage 105 to exhaust port 107. Under these conditions it is essential that the slide valve 68 be maintained in the upper position to prevent a straight air reapplication of the brakes. In order to complete the release of the straight air brake application on the locomotive the independent brake valve handle 21, still depressed, is returned to the release lock-down position in which handle 21 is maintained depressed to forestall reapplication of the brakes. This position is provided on the commercial S-40-D independent brake valve in order that the handle may be retained in the depressed position without having to be held in that position by the engineman.

If the switch 39 and the valve 35 are each open, then the independent brake valve will function according to the normal principles which characterized it before the electrical release connections of my prior application and of the present application were devised. These operations are well understood in the art and it would serve no useful purpose to recount them. They are, however, stated in considerable detail in application Serial No. 135,936.

It is important to observe that the check valve 83 performs a number of useful functions. When the electrical mechanism is functioning, it isolates the actuating pipe 14 so that it can neither delay the effect of the electrical release nor defeat that release by venting the space below diaphragm 77. Similarly, during pneumatic control of independent releases it prevents loss of pressure through the passage 82 and past the exhaust valve 94.

I claim:

1. The combination of a multiple-unit locomotive brake system comprising a plurality of control valves each having an independent application-and-release portion including a pilot valve and a pressure motor for operating the pilot valve; an application-and-release pipe connected to said application-and-release portions; an actuating pipe connected to said application-and-release portions; an independent brake valve connected to both said pipes said valve including a release-controlling electric switch and being capable of two manipulations, in one of which it varies fluid pressure in the application-and-release pipe and in the other of which it may be caused to charge or vent the actuating pipe and simultaneously therewith open or close said release-controlling electric switch; an electrically operable admission and exhaust valve controlling said pressure motor; a circuit including said release-controlling switch and said electrically operable valve; and means operable to interrupt selectively said circuit and said actuating pipe whereby they are rendered selectively effective as the control connection between said independent brake valve and said pressure motor.

2. The combination defined in claim 1 in which the means for rendering said circuit and said actuating pipe selectively effective includes a double-seated check valve interposed in the connections to the pressure motor and arranged to inhibit loss of pressure from said motor through the actuating pipe or the electrically operable admission and exhaust valve whichever is at the time ineffective as a part of the control connection.

3. The combination of a multiple-unit locomotive brake system comprising a plurality of control valves each having an independent application-and-release portion including a pilot valve and a pressure motor for operating the pilot valve; an application-and-release pipe connected to said application-and-release portions; an actuating pipe connected to said application-and-release portions; an independent brake valve connected to both said pipes said valve including a release-controlling electric switch and being capable of two manipulations, in one of which it varies fluid pressure in the application-and-release pipe and in the other of which it may be caused to charge or vent the actuating pipe and simultaneously therewith open or close said release-controlling electric switch; an electrically operable admission and exhaust valve controlling said pressure motor; selector valve means for connecting said motor alternatively with said actuating pipe or with said electrically operable valve means; a valve operable to close said actuating pipe; an electric circuit including said electrically operable valve and said release-controlling switch; and cut-out means having a setting in which it continuously interrupts said circuit.

4. The combination defined in claim 3 in which said selector valve means comprises a double-seated check valve.

MARK PICKERT.

References Cited in the file of this patent

UNITED STATES PATENTS

| Number | Name | Date |
| --- | --- | --- |
| 2,464,977 | Gorman | Mar. 22, 1949 |